United States Patent [19]

Tanuma et al.

[11] Patent Number: 4,511,627
[45] Date of Patent: Apr. 16, 1985

[54] SANDWICH GLASSES

[75] Inventors: Itsuo Tanuma, Tokorozawa; Hideo Takeichi, Higashimurayama; Yukio Fukuura, Kawagoe; Tomio Ohyachi, Akigawa; Kazuo Naito, Kawasaki, all of Japan

[73] Assignee: Bridgestone Tire Company Limited, Tokyo, Japan

[21] Appl. No.: 433,336

[22] Filed: Oct. 7, 1982

[30] Foreign Application Priority Data

Oct. 7, 1981 [JP] Japan ................... 56-158723
Nov. 5, 1981 [JP] Japan ................... 56-176549

[51] Int. Cl.$^3$ .................. B32B 17/10; B32B 27/30
[52] U.S. Cl. .................. 428/429; 428/442; 428/447; 428/522
[58] Field of Search .............. 428/442, 429, 447, 522

[56] References Cited

U.S. PATENT DOCUMENTS

| | | | |
|---|---|---|---|
| 3,488,715 | 1/1970 | Atkins | 428/442 |
| 3,622,440 | 11/1971 | Snedeker | 428/412 |
| 3,666,614 | 5/1972 | Snedeker | 428/442 |
| 4,137,364 | 11/1976 | Ball | 428/442 |
| 4,296,017 | 10/1981 | Weissqerbes | 428/442 |
| 4,303,739 | 12/1981 | Beckmann | 428/442 |
| 4,309,484 | 1/1982 | Ohmae | 428/442 |
| 4,317,862 | 3/1982 | Honda | 428/442 |
| 4,319,811 | 3/1982 | Tu | 428/442 |
| 4,338,227 | 7/1982 | Ballard | 524/296 |

*Primary Examiner*—Ellis P. Robinson
*Attorney, Agent, or Firm*—Sughrue, Mion, Zinn, Macpeak, and Seas

[57] ABSTRACT

A sandwich glass comprising glass plates and an intermediate layer interposed therebetween is disclosed. The intermediate layer is formed by crosslinking or photocrosslinking a resin composition comprising an ethylenevinyl acetate copolymer and an organic peroxide or a photosensitizer under heating of the resin composition above the melting point of the copolymer.

11 Claims, No Drawings

SANDWICH GLASSES

This invention relates to sandwich glasses used in front glass for automobiles, window glass for buildings and so on.

In this type of the sandwich glass, plasticized polyvinylbutyral resins have commonly been used in an intermediate layer for the sandwich glass. However, such resins are thermoplastic and have the following some drawbacks in the use for the production of the intermediate layer.

(1) Since the softening point of the resin is relatively low, the sliding between the glass plates and the occurrence of bubbles are observed when the sandwich glass is heated.

(2) Since the sandwich glass is apt to be influenced by moisture content, when the sandwich glass is left to stand in high-humidity atmosphere for a long period of time, not only the sandwich glass becomes hazy from its peripheral part, but also the adhesive strength of the resin to the glass plate lowers.

(3) The penetration resistance remarkably degrades at a temperature range above room temperature (about 30° C.) because the resistance to impact fracture highly depends upon the temperature.

It is, therefore, an object of the invention to provide novel sandwich glasses which can avoid and overcome the above mentioned drawbacks of the conventional sandwich glass by using a resin materials instead of the plasticized polyvinylbutyral resin as an intermediate layer.

For this purpose, the inventors have made various studies with respect to the resin materials and took notice of ethylene-vinyl acetate copolymer resin (hereinafter referred to as EVA resin). The transparency and other properties of EVA resin are varied in accordance with the vinyl acetate content. For instance, when the vinyl acetate content is about 40%, the transparency is good, but the tensile properties come into problem, the strength at rupture is low and the elongation is more than 1,000% so that the use of EVA resin having such a vinyl acetate content is not suitable for the formation of the intermediate layer in the sandwich glass. While, when the vinyl acetate content is about 15%, the strength properties are satisfied to a certain extent as a material for the intermediate layer of the sandwich glass, but the transparency is low in practice, so that the EVA resin having such a vinyl acetate content may not be suitable for the formation of the highly transparent intermediate layer. Moreover, the EVA resin is easily influenced by temperature owing to the thermoplasticity and has particularly a drawback of causing deterioration of the properties at high-temperature side likewise the conventional plasticized polyvinylbutyral resin. As described above, the transparency is certainly improved by increasing the vinyl acetate content, but its cloudy phenomenon (opaque white) still comes into problem as compared with the transparency of the glass plate to be superposed.

Now, the inventors have made further investigations and found that when ethylene-vinyl acetate copolymer is crosslinked or photocrosslinked by heating the resin composition above the melting point of the copolymer in the presence of an organic peroxide or a photosensitizer, the resulting EVA resin exhibits a surprisingly high transparency and is very suitable as an intermediate layer for the sandwich glass in view of the properties, and as a result the invention has been accomplished.

According to the invention, ethylene-vinyl acetate copolymers to be used have a vinyl acetate content of 15-50% by weight, preferably 19-40% by weight. When the vinyl acetate content exceeds 50% by weight, the transparency is good, but the modulus lowers and the good penetration resistance cannot be obtained even by adding as a curing assistant an acrylic monomer as mentioned below. While, when the vinyl acetate content is less than 15% by weight, even if the resin is crosslinked at high temperature, the improvement of transparency is difficult. Moreover, when the sandwich glass is used for applications aiming mainly the prevention of the breaking or scattering of glass pieces due to collision with small objects or the like and requiring no high transparency, the vinyl acetate content may be less than 15% by weight.

In the first aspect of the invention, an organic peroxide is used as a curing agent for the ethylene-vinyl acetate copolymer in the manufacture of the sandwich glass. As the organic peroxide, use may be made of any compounds producing radicals by decomposition at a temperature above 100° C., but the use of compounds having a half-life period of 10 hours and a decomposition temperature of not less than 70° C. is preferable considering the stability during the blending. As the organic peroxide, mention may be made of 2,5-dimethylhexane-2,5-dihydroperoxide, 2,5-dimethyl-2,5-di(t-butylperoxy)hexane-3, di-t-butyl peroxide, t-butylcumyl peroxide, 2,5-dimethyl-2,5-di(t-butylperoxy)hexane, dicumyl peroxide, α,α'-bis(t-butylperoxyisopropyl)benzene, n-butyl-4,4'-bis(t-butylperoxy)valerate, 2,2-bis(t-butylperoxy)butane, 1,1-bis(t-butylperoxy)cyclohexane, 1,1-bis(t-butylperoxy)3,3,5-trimethyl cyclohexane, t-butylperoxy benzoate, benzoyl peroxide and the like. At least one organic peroxide selected from the above compounds is used in an amount of not more than 5 parts by weight based on 100 parts by weight of ethylene-vinyl acetate copolymer. Moreover, the organic peroxide may be used by dissolving in an organic solvent or a plasticizer.

In the second aspect of the invention, a photosensitizer is added to the ethylene-vinyl acetate copolymer. As the photosensitizer, use may be made of any compounds directly or indirectly producing radicals by irradiation of light, an example of which includes benzoin, benzophenone, benzoin methyl ether, benzoin ethyl ether, benzoin isopropyl ether, benzoin isobutyl ether, dibenzyl, 5-nitroacenaphthene, hexachloro cyclopentadiene, p-nitrodiphenyl, p-nitroaniline, 2,4,6-trinitroaniline, 1,2-benzanthraquinone, 3-methyl-1,3-diaza-1,9-benzanthrone and the like. Among them, at least one photosensitizer is added in an amount of not more than 5 parts by weight based on 100 parts by weight of the ethylene-vinyl acetate copolymer.

In the preferred embodiment of the invention, a plasticizer is added to the mixture of ethylene-vinyl acetate copolymer and organic peroxide or photosensitizer in an amount of 0.5-30 parts, preferably 1-10 parts based on 100 parts of the mixture. Such an addition amount of the plasticizer is determined by considering the compatibility with EVA, necessary transparency, impact resistance after the manufacture of the sandwich glass and the like. When the amount of the plasticizer is less than 0.5 part, the addition effect is substantially insignificant, while when the amount exceeds 30 parts, the bleeding of the plasticizer from the mixture is caused and the properties of the resulting mixture considerably lower.

As the plasticizer, use may be made of high-purity paraffinic oil giving no coloring nor increasing of haze value to EVA intermediate layer, naphthenic oil, phthalate ester, adipate ester, sebacate ester, thioglycol, ether series plasticizers such as dibenzyl ether and the like, phosphoric acid series plasticizer such as tricresyl phosphate and the like, maleate esters such as dioctyl maleate and the like, epoxy plasticizer and so on.

The addition of the plasticizer lowers the processing temperature in case of uniformly dispersing the organic peroxide or photosensitizer into EVA and in case of forming film or sheet from the resin composition by various processing machines, whereby the gelation, scorching or the like of the resin composition can be prevented.

According to the invention, an acryloyloxy or methacryloyloxy group-containing compound selected from derivatives of acrylic and methacrylic acids, or a vinyl or allyl group-containing compound may be added as a curing assistant to the resin composition in an amount of not more than 50% by weight per ethylene-vinyl acetate copolymer. The addition of the curing assistant contributes not only to improve the properties, particularly initial modulus of EVA resin as an intermediate layer to enhance the penetration resistance but also to improve the crosslinking degree and crosslinking rate in case of the photocrosslinking. As the derivative of acrylic or methacrylic acid, there are most commonly used esters and amides. As an alcohol radical of such an ester, mention may be made of alkyl groups such as methyl group, ethyl group, dodecyl group, stearyl group, lauryl group and the like; cyclohexyl group, tetrahydrofurfuryl group, aminoethyl group, 2-hydroethyl group, 3-hydroxypropyl group, 3-chloro-2-hydroxypropyl group and so on. Further, there may be used esters with polyfunctional alcohols such as ethylene glycol, triethylene glycol, polyethylene glycol, trimethylol propane, pentaerythritol and the like. A typical example of the amide is diacetone acrylamide. As the vinyl group-containing compound, use may be made of styrene, divinylbenzene and the like. As the allyl group-containing compound, use may be made of triallyltrimellitate, triallylisocyanurate, diallylphthalate and the like.

In order to improve the adhesion between the intermediate layer and the glass plate, a well-known saline coupling agent may be added to the resin composition in an amount of not more than 5% by weight per the ethylene-vinyl acetate copolymer. As the silane coupling agent, mention may be made of γ-chloropropyl trimethoxysilane, vinyltrichlorosilane, vinyltriethoxysilane, vinyl-tris(β-methoxy)silane, γ-methacryloxypropyl trimethoxysilane, β-(3,4-ethoxycyclohexyl)ethyltrimethoxysilane, γ-glycidoxypropyl trimethoxysilane, vinyl-triacetoxysilane, γ-mercaptopropyl trimethoxysilane, γ-aminopropyl triethoxysilane, N-β-(aminoethyl)-γ-aminopropyl trimethoxysilane and the like. Alternatively, a method of subjecting the intermediate layer to corona discharge, low temperature plasma treatment (glow discharge), electron beam irradiation, ultraviolet ray irradiation or the like is effective for improving the adhesion.

Furthermore, in order to improve the storage stability, not more than 5% by weight of a polymerization inhibitor such as hydroquinone, hydroquinone monomethyl ether, p-benzoquinone, methylhydroquinone or the like may be added to the resin composition. In addition to the above described additives, colorant, ultraviolet absorbing agent, stabilizer, discoloration-preventing agent and the like may be optionally added to the resin composition in accordance with use purposes.

The manufacture of sandwich glass using the EVA resin composition can be performed in the same manner as in the manufacture of sandwich glass using the conventional plasticized polyvinylbutyral resin. That is, the resin composition is thoroughly kneaded by means of a roll mill or the like and then shaped into a sheet using an extruder, a calender, an inflation die, a hot press or the like. The resulting sheet is interposed between two glass plates to be superposed and gradually heated up to about 80° C. while passing through several sets of rolls, during which the sheet is softened and adhered tightly to the glass plates while expelling air existent between the sheet and the glass plate by increasing a pressure between rolls. Then, the resulting glass assembly provided with the uncured resin intermediate layer is heated on a hot plate, whereby the intermediate layer is crosslinked to provide a sandwich glass having a completely transparent intermediate layer. In this case, there may be used of any heating means usually used in industry such as hot air, oven, autoclave, infrared or far infrared ray irradiation, dielectric heat and the like.

Moreover, in order to completely expel air from the space between the glass plate and the intermediate layer, the glass assembly may be housed in a rubber bag or the like and then the pressure inside the bag may be reduced under heating, whereby the intermediate layer may be adhered tightly to the glass plates.

When the intermediate layer contains the photosensitizer, light is irradiated to the glass assembly during the heating, whereby the intermediate layer is photocrosslinked. In this case, various light sources emitting light at ultraviolet to visible regions can be adopted, an example of which includes extra-high pressure mercury lamp, high pressure mercury lamp, low pressure mercury lamp, chemical lamp, xenon lamp, halogen lamp, mercury-xenon lamp, carbon arc lamp, sun light, incandescent lamp, laser beam and the like as disclosed by S. P. Pappers in "UV Curing", *Science and Technology*, Technology Marketing Corporation, 1980. The irradiation time is dependent upon the kind of lamp and light intensity, but it is usually within a range of several tens of second to several tens of minutes.

In order to perform the heating before or during the light irradiation, heat ray radiated from the light source may be locally or wholly utilized. In addition, known heat source such as hot air, electric heat, dielectric heat, warm water, steam, far infrared ray or the like can be used directly or indirectly. In other words, the heating means may optionally be selected so far as the intermediate layer is heated above the predetermined temperature during the light irradiation. In any case, it is necessary to heat the intermediate resin layer to a temperature above its melting point because the transparency of the resulting sandwich glass is insufficient when the heating is performed at a temperature below the melting point.

As mentioned above, the production step of sandwich glass using ethylene-vinyl acetate resin according to the invention is the same as in the case of using the conventional plasticized polyvinylbutyral resin. However, there is a great difference in the technique between both the production steps because when the glass assembly according to the invention is heated on a hot plate, the intermediate resin layer is crosslinked and at the same time changed from the cloudy state into transparent state, which can solve the defects produced in the use of the conventional plasticized polyvinylbutyral resin.

According to the invention, the intermediate resin layer is strongly bonded to the glass plates by crosslinking or photocrosslinking without adjustment of moisture content after the removal of salt sprayed on the sheet by washing with water required in the use of the conventional plasticized polyvinylbutyral resin, so that there is no formation of bubbles and no sliding between the glass plates due to the softening of the intermediate layer even when the sandwich glass is exposed to high temperatures. Furthermore, even when the sandwich glass is broken due to impact, there is caused no peeling-off between the intermediate layer and the glass plate, so that the scattering of broken glass pieces is prevented to the utmost. Moreover, the temperature dependence of penetration resistance of the sandwich glass according to the invention is small as compared with that of the conventional sandwich glass using the plasticized polyvinylbutyral resin as an intermediate layer.

The following examples are given in illustration of this invention and are not intended as limitations thereof.

EXAMPLES 1-5

(a) Preparation of EVA Resin Composition

Five EVA resin compositions each having a compounding recipe as shown in the following Table 1 were prepared by mixing in roll mill heated at a temperature of about 80° C.-130° C.

TABLE 1

| Example | 1 | 2 | 3 | 4 | 5 |
|---|---|---|---|---|---|
| | (part by weight) | | | | |
| Commercially available ethylene-vinyl acetate copolymer | | | | | |
| vinyl acetate content: 40 wt % | 100 | | | | |
| vinyl acetate content: 33 wt % | | 100 | | | |
| vinyl acetate content: 28 wt % | | | 100 | | 100 |
| vinyl acetate content: 19 wt % | | | | 100 | |
| Dicumyl peroxide | 1 | 1 | 1 | 1 | 0.5 |
| γ-glycidoxypropyl trimethoxysilane | 0.5 | 0.5 | 0.5 | 0.5 | 0.5 |

(b) Manufacture of Sandwich Glass

The resin composition described in the above item (a) was shaped into a sheet having a thickness of 0.36 mm through polyethylene terephthalate film by a hot press. After cooled to room temperature, the resulting resin sheet was peeled off from the polyethylene terephthalate film and interposed between two previously washed and dried float glasses with a thickness of 3 mm. Then, the resulting glass assembly was deaerated under vacuum in a rubber bag, subjected to a preliminary contact bonding at a temperature above 80° C. and thereafter heated on a hot plate at a temperature of 160° C. for 20 minutes.

The thus obtained sandwich glass had a high transparency and no optical distortion.

(c) Impact Test

A steel ball having a weight of 225 g and a smooth surface was dropped from a height of 5 m to a central portion of a sandwich glass according to an impact test method of JIS R 3025.

In all sandwich glasses of Examples 1-5, the steel ball did not penetrate through the sandwich glass, and also cracks of the intermediate resin layer and the scattering of glass pieces were hardly produced.

(d) Transparency Test

The transmittance and haze value of the sandwich glasses in Examples 1-5 were measured by using an integral-type turbidimeter made by Tokyo Denshoku Co., Ltd.

For the comparison, the same test was made with respect to the sandwich glass using only the EVA resin of each of Examples 1-5 as an intermediate layer.

The measured results are shown in the following Table 2.

TABLE 2

| | Transmittance (%) | Haze value (%) |
|---|---|---|
| Comparative Example 1 (EVA resin, vinyl acetate content: 40 wt %) | 82.5 | 1.1 |
| Example 1 | 81.5 | 0.1 |
| Comparative Example 2 (EVA resin, vinyl acetate content: 33 wt %) | 82.5 | 3.1 |
| Example 2 | 82 | 0.1 |
| Comparative Example 3 (EVA resin, vinyl acetate content: 28 wt %) | 80.7 | 3.1 |
| Example 3 | 82 | 0.1 |
| Comparative Example 4 (EVA resin, vinyl acetate content: 19 wt %) | 79.0 | 35.4 |
| Example 4 | 83 | 0.6 |
| Example 5 | 83 | 0.2 |

As apparent from Table 2, the effect of improving the haze value according to the invention is remarkably conspicuous and the resulting sandwich glass is sufficiently suitable for practical use.

EXAMPLES 6-8

(a) Preparation of EVA Resin Composition

Three EVA resin compositions were prepared in the same manner as described in Example 1 using a compounding recipe (part by weight) as shown in the following Table 3.

TABLE 3

| Example | 6 | 7 | 8 |
|---|---|---|---|
| EVA resin, vinyl acetate content: 28 wt % | 90 | 80 | 90 |
| Ethylene glycol dimethacrylate | 10 | 20 | — |
| Trimethylpropane trimethacrylate | — | — | 10 |
| Dicumyl peroxide | 1 | 1 | 1 |
| γ-glycidoxypropyl trimethoxysilane | 0.5 | 0.5 | 0.5 |

(b) Maufacture of Sandwich Glass

The sandwich glass was manufactured by using the above EVA resin composition in the same manner as described in Example 1, except that the thickness of the resin sheet was 0.90 mm. The resulting sandwich glass of Examples 6-8 had a high transparency and no optical distortion.

(c) Impact Test

A steel ball having a weight of 2.3 kg and a smooth surface was dropped from a height of 4 m to a central portion of a sandwich glass according to an impact test method of JIS 3211 and 3212. In all sandwich glasses of Examples 6-8, the steel ball did not penetrate through the sandwich glass, and also there was produced no scattering of glass pieces.

(d) Transparency Test

The haze value in the sandwich glasses of Examples 6-8 was measured in the same manner as described in Example 1 to obtain a result as shown in the following Table 4.

For the comparison, the haze value of sandwich glass using only the EVA resin as an intermediate layer with a thickness of 0.90 mm is also shown in Table 4.

TABLE 4

|  | Haze value (%) |
| --- | --- |
| Comparative Example 5 (EVA resin, vinyl acetate content: 28 wt %) | 3.8 |
| Example 6 | 0.1 |
| Example 7 | 0.1–0 |
| Example 8 | 0.1 |

(e) Tensile Test of Resin Sheet

Each of the EVA resin compositions of Examples 6-8 was shaped into a cured sheet having a thickness of 1 mm by means of a hot press under curing conditions of 160° C. and 20 minutes. A sample was punched out from the cured sheet by a punch of DIN No. 3, whose tensile properties were measured by an autograph (tensile testing machine, made by Shimazu Seisakusho) at a crosshead speed of 200 mm/min to obtain results as shown in the following Table 5.

TABLE 5

|  | Comparative Example 5 | Example 6 | Example 7 | Example 8 |
| --- | --- | --- | --- | --- |
| 50% Modulus (kg/cm$^2$) | 29.3 | 39.2 | 50.0 | 43.6 |
| 100% Modulus (kg/cm$^2$) | 31.9 | 43.0 | 56.7 | 53.2 |
| 300% Modulus (kg/cm$^2$) | 39.0 | 76.8 | 110 | 89.4 |
| Tensile strength at break (kg/cm$^2$) | 119 | 269 | 273 | 272 |
| Elongation at break (%) | 650 | 590 | 500 | 540 |

EXAMPLES 9-12

(a) Preparation of EVA Resin Composition

Three EVA resin compositions A-C were prepared according to a compounding recipe as shown in the following Table 6 by means of a roll mill heated at 80°-90° C.

TABLE 6

|  | A | B | C |
| --- | --- | --- | --- |
| Commercially available EVA copolymer |  |  |  |
| vinyl acetate content: 33 wt % | 100 |  |  |
| vinyl acetate content: 28 wt % |  | 100 |  |
| vinyl acetate content: 25 wt % |  |  | 100 |
| Benzoin isopropyl ether | 1 | 1 | 1 |
| γ-glycidoxypropyl trimethoxysilane | 0.5 | 0.5 | 0.5 |

(b) Manufacture of Sandwich Glass

Each of the EVA resin compositions A-C was shaped into a sheet having a thickness of 0.4 mm through polyester films by a press at 100° C. After the polyester film was peeled off, the resulting resin sheet was interposed between two washed and dried float glasses with a thickness of 3 mm and deaerated under vacuum in a rubber bag at a temperature of 100° C. for 5 minutes to obtain a bubble-free glass assembly. Immediately, an ultraviolet ray was irradiated to the resulting glass assembly by means of a 4 kw ultraviolet ray irradiation apparatus from a distance of 15 cm for 1 minute, provided that the irradiation was performed to one surface of the glass assembly for 30 seconds, to manufacture a sandwich glass corresponding to each of Examples 9-11. Moreover, the sandwich glass of Example 12 was manufactured by heating the glass assembly provided with the intermediate layer of the EVA resin composition C at a temperature of 160° C. and irradiating the ultraviolet ray in the same manner as described above.

(c) Impact Test

The same impact test according to JIS R 3025 as described in Example 1 was repeated with respect to the sandwich glasses of Examples 9-12.

In these sandwich glasses, the steel ball did not penetrate through the sandwich glass, and also there were produced no cracks of the intermediate layer and no scattering of glass pieces.

(d) Transparency Test

The haze value of each sandwich glass of Examples 9-12 was measured in the same manner as described in Example 1 to obtain a result as shown in the following Table 7.

TABLE 7

|  | Haze value (%) |
| --- | --- |
| Example 9 | 0.12 |
| Example 10 | 0.3 |
| Example 11 | 0.8 |
| Example 12 | 0.6 |

EXAMPLES 13-15

(a) Preparation of EVA Resin Composition

The EVA resin composition was prepared according to a compounding recipe as shown in the following Table 8 in the same manner as described in Example 9.

TABLE 8

| Example | 13 | 14 | 15 |
| --- | --- | --- | --- |
| EVA resin, vinyl acetate content: 25 wt % | 90 | 80 | 80 |
| Trimethylolpropane trimethacrylate | 10 | 20 | 10 |
| Ethyleneglycol dimethacrylate |  |  | 10 |
| Benzoin isopropyl ether | 1 | 1 | 1 |
| γ-glycidoxypropyl trimethoxysilane | 0.5 | 0.5 | 0.5 |

(b) Manufacture of Sandwich Glass

The sandwich glass was manufactured by using the above EVA resin composition in the same manner as described in Example 9 except that the thickness of the intermediate layer was 1.0 mm.

(c) Impact Test

The same impact test as described in Example 6 was repeated with respect to the sandwich glass.

In all sandwich glasses of Examples 13-15, the steel ball did not penetrate through the sandwich glass, and also there was produced no scattering of glass pieces.

(d) Measurement of Properties

The EVA resin composition was shaped into a sheet having a thickness of about 1 mm through polyester films by a press heated at 100° C. Immediately after taken out from the press, the resulting sheet was photocrosslinked by irradiating an ultraviolet ray emitted from a 4 kg ultraviolet ray irradiation equipment to both surfaces of the sheet at a distance of 15 cm for a total time of 1 minute. After the peeling-off of the polyester film, the tensile properties of the sheet were measured in the same manner as described in Example 6 to obtain results as shown in the following Table 9.

TABLE 9

|  | Comparative Example 6 | Example 13 | Example 14 | Example 15 |
| --- | --- | --- | --- | --- |
| 50% Modulus (kg/cm$^2$) | 29.3 | 34 | 47 | 43 |
| 100% Modulus (kg/cm$^2$) | 31.9 | 38 | 55 | 50 |
| 300% Modulus (kg/cm$^2$) | 39.0 | 64 | 118 | 104 |
| Tensile strength at break (kg/cm$^2$) | 119 | 179 | 218 | 198 |
| Elongation at break (%) | 650 | 560 | 450 | 450 |
| Haze value (%) | 3.8 | 0.95 | 0.24 | 0.24 |

Note
In Comparative Example 6, only the EVA resin composition having a vinyl acetate content of 25% by weight was used as an intermediated layer.

As apparent from Table 9, the addition of methacrylate ester improves the properties of the intermediate layer.

EXAMPLE 16

This example shows an addition effect of a plasticizer in regard to the EVA resin composition.

The EVA resin composition having a compounding recipe as shown in the following Table 10 was uniformly kneaded by means of a roll mill. In this case, the roll temperature for kneading was measured to obtain a result as shown in Table 10. Then, the resulting resin composition was shaped into a sheet by extruding through a T-die (slit: 0.5 mm, width: 400 mm, die temperature: 100° C.) mounted to a small extruder having a screw diameter of 40 mm, which was interposed between the two glass plates and adhered tightly to the glass plate under reduced pressure in a rubber bag. In this case, the temperature for adhering to the glass plate was visually measured to obtain a result as shown in Table 10. For the comparison, the temperatures on the EVA resin composition having no plasticizer (which substantially corresponds to Example 4) were measured to obtain results as shown in Table 10.

TABLE 10

|  | Example 16 | Control |
| --- | --- | --- |
| Commercially available EVA copolymer vinyl acetate content: 19 wt % | 100 | 100 |
| Dicumyl peroxide | 1 | 1 |
| Dioctylphthalate | 10 | — |
| γ-glycidoxypropyl trimethoxysilane | 1 | 1 |
| Roll temperature for kneading (°C.) | 85 | 105 |
| Temperature for adhering to glass plate (°C.) | 75 | 100 |

As apparent from Table 10, the roll temperature for kneading and the temperature for adhering to glass plate can be reduced by adding the plasticizer to the EVA resin composition.

EXAMPLES 17-21

The EVA resin composition having a compounding recipe as shown in the following Table 11 was kneaded by means of a roll mill and shaped into a sheet having a size of 300 mm × 300 mm × 0.4 mm by a press. The resulting resin sheet was interposed between two float glasses each having a size of 300 mm × 300 mm × 3 mm and deaerated at 75° C. under a reduced pressure in a rubber bag to obtain a bubble-free glass assembly. Then, the glass assembly was placed on a hot press, where the crosslinking of the resin sheet was performed under heating conditions of 160° C. and 20 minutes to obtain a transparent sandwich glass. The haze value of the sandwich glass was measured in the same manner as described in Example 1 to obtain a result as shown in Table 11.

TABLE 11

| Example | 17 | 18 | 19 | 20 |
| --- | --- | --- | --- | --- |
| Commercially available EVA copolymer | | | | |
| vinyl acetate content: 28 wt % (15)* | 100 | | | |
| vinyl acetate content: 25 wt % (2)* | | 100 | | |
| vinyl acetate content: 19 wt % (25)* | | | 100 | 100 |
| Dioctylphthalate | 10 | 10 | 10 | |
| Dioctyladipate | | | | 10 |
| Dicumyl peroxide | 1 | 1 | 1 | 1 |
| γ-glycidoxypropyl trimethoxysilane | 0.5 | 0.5 | 0.5 | 0.5 |
| Stearic acid | 0.5 | 0.5 | 0.5 | 0.5 |
| Haze value (%) | 0 | 0.1 | 0.2 | 0.5 |

(Note)
*The value in parenthesis is a value of metal flow index according to JIS K 6730.

As apparent from Table 11, the reduction of haze value (or the improvement of transparency) is achieved even when the plasticizer is added to the EVA resin composition.

The impact test for the sandwich glass was made by dropping a steel ball having a weight of 2.3 kg and a smooth surface from a height of 1.5 m according to JIS 3211 and 3212 to obtain a result as shown in Table 12. In this case, the sandwich glass was manufactured by using as an intermediate layer having a thickness of 0.45 mm the resin sheets of Examples 18 and 19 as well as a resin sheet of Example 21 having the same compounding recipe as in Example 18 except that a commercially available EVA copolymer having a vinyl acetate content of 19% was used.

TABLE 12

| Example | 18 | 19 | 21 |
| --- | --- | --- | --- |
| Dropping of steel ball from height of 1.5 m | no penetration | no penetration | no penetration |

As apparent from Table 12, the deterioration of impact resistance is hardly produced each when the plasticizer is added to the EVA resin composition.

EXAMPLE 22

An EVA resin composition consisting of 100 parts by weight of commercially available EVA copolymer (vinyl acetate content: 28% by weight, melt flow index: 15) and 1 part by weight of 2,5-dimethyl-2,5-di(t-butylperoxy)hexane was kneaded by means of a roll mill and shaped into three sheets each having a size of 300 mm × 300 mm × 0.4 mm by a press.

Among these sheets, a first sheet was subjected to an electron beam irradiation using an electron beam accelerator under such conditions that the acceleration voltage was 300 KeV and the irradiation dose was 5 Mrad. A second sheet was subjected to a corona discharge using a corona discharge device under such a condition that the front and rear surfaces of the sheet were charged at a treating power of 1.34 kw/m²/min, respectively. A third sheet was not subjected to a special treatment.

Each of these three sheets was interposed between two glass plates and heated at 160° C. for 20 minutes in the same manner as described in Example 1 to obtain a transparent sandwich glass.

The impact test was made with respect to the resulting sandwich glass in the same manner as described in Example 18 to obtain results as shown in the following Table 13.

TABLE 13

|  | First sheet | Second sheet | Third sheet |
|---|---|---|---|
| Dropping of steel ball from height of 1.5 m | no penetration | no pentration | no pentration |
| Amount of glass pieces scattered | very few | very few | much |
| Haze value (%) | 0.2 | 0.1 | 0.1 |

As apparent from Table 3, the amount of glass pieces scattered considerably reduces in the first and second sheets, which results in the considerable improvement of the adhesion between the sheet and the glass plate.

What is claimed is:

1. A sandwich glass comprising glass plates and an intermediate layer interposed therebetween, said intermediate layer being formed by crosslinking a resin composition comprising:
   (a) an ethylene-vinyl acetate copolymer having a vinyl acetate content of 15%–50% by weight,
   (b) an organic peroxide selected from at least one member of the group consisting of 2-5-, dimethyl-2, 5-di(t-butylperoxy)hexane-3, t-butylcymyl peroxide, 2,5-dimethyl-2, 5-di(t-butylperoxy)hexane, dicumyl peroxide, α,α'bis(t-butylperoxyisopropyl)-benzene, n-butyl-4,4-bis(t-butylperoxy)valerate, 2,2-bis(t-butylperoxy)butane, 1,1-bis(t-butylperoxy)cyclohexane, 1,1-bis(t-butylperoxy)3,3,5-trimethyl cyclohexane and t-butylperoxy benzoate, and
   (c) a curing assistant selected from at least one member of the group consisting of acryloyloxy group-containing compounds, methacryloyloxy group-containing compounds, allyl group-containing compounds and vinyl group-containing compounds wherein said curing assistant is not a silane compound, at a temperature above the melting point of the copolymer.

2. A sandwich glass comprising glass plates and an intermediate layer interposed therebetween, said intermediate layer being formed by photocrosslinking a resin composition comprising:
   (a) an ethylene-vinyl acetate copolymer having a vinyl acetate content of 15–50% by weight,
   (b) a photosensitizer, and
   (c) a curing assistant selected from at least one member of the group consisting of acryloyloxy group-containing compounds, methacryloyloxy group-containing compounds, allyl group-containing compounds and vinyl group-containing compounds wherein said curing assistant is not a silane compound,
under light irradiation during or after heating said resin composition at a temperature above the melting point of the copolymer.

3. A sandwich glass according to claim 1, wherein said organic peroxide is added in an amount of not more than 5 parts by weight based on 100 parts by weight of the ethylene-vinyl acetate copolymer.

4. A sandwich glass according to claim 1, wherein said resin composition further contains 0.5–30 parts by weight of a plasticizer selected from high-purity paraffinic oil, naphthenic oil, phthalate ester, adipate ester, sebacate ester, thioglycol, dibenzyl ether, tricresyl phosphate, dioctyl maleate and epoxy plasticizer.

5. A sandwich glass according to claim 1, wherein said curing assistant is contained in an amount of not more than 50% by weight in said resin composition.

6. A sandwich glass according to claim 1, wherein said resin composition contains not more than 5% by weight of a silane coupling agent.

7. A sandwich glass according to claim 2, wherein said photosensitizer is at least one substance selected from benzoin, benzophenone, benzoin methyl ether, benzoin ethyl ether, benzoin isopropyl ether, benzoin isobutyl ether, dibenzyl, 5-nitro acetonaphthene, hexachloro cyclopentadiene, p-nitrodiphenyl, p-nitroaniline, 2,4,6-trinitroaniline, 1,2-benzanthraquinone and 3-methyl-1,3-diaza-1,9-benzanthrone.

8. A sandwich glass according to claim 2, wherein said photosensitizer is added in an amount of not more than 5 parts by weight based on 100 parts by weight of the ethylene-vinyl acetate copolymer.

9. A sandwich glass according to claim 2, wherein said resin composition further contains 0.5–30 parts by weight of a plasticizer selected from high-purity paraffinic oil, naphthenic oil, phthalate ester, adipate ester, sebacate ester, thioglycol, dibenzyl ether, tricresyl phosphate, dioctyl maleate and epoxy plasticizer.

10. A sandwich glass according to claim 2, wherein said curing assistant is contained in an amount of not more than 50% by weight in said resin composition.

11. A sandwich glass according to claim 2, wherein said resin composition contains not more than 5% by weight of a silane coupling agent.

* * * * *